March 1, 1932.   J. M. CHRISTMAN   1,847,171
PATTERN LATHE
Filed April 7, 1930
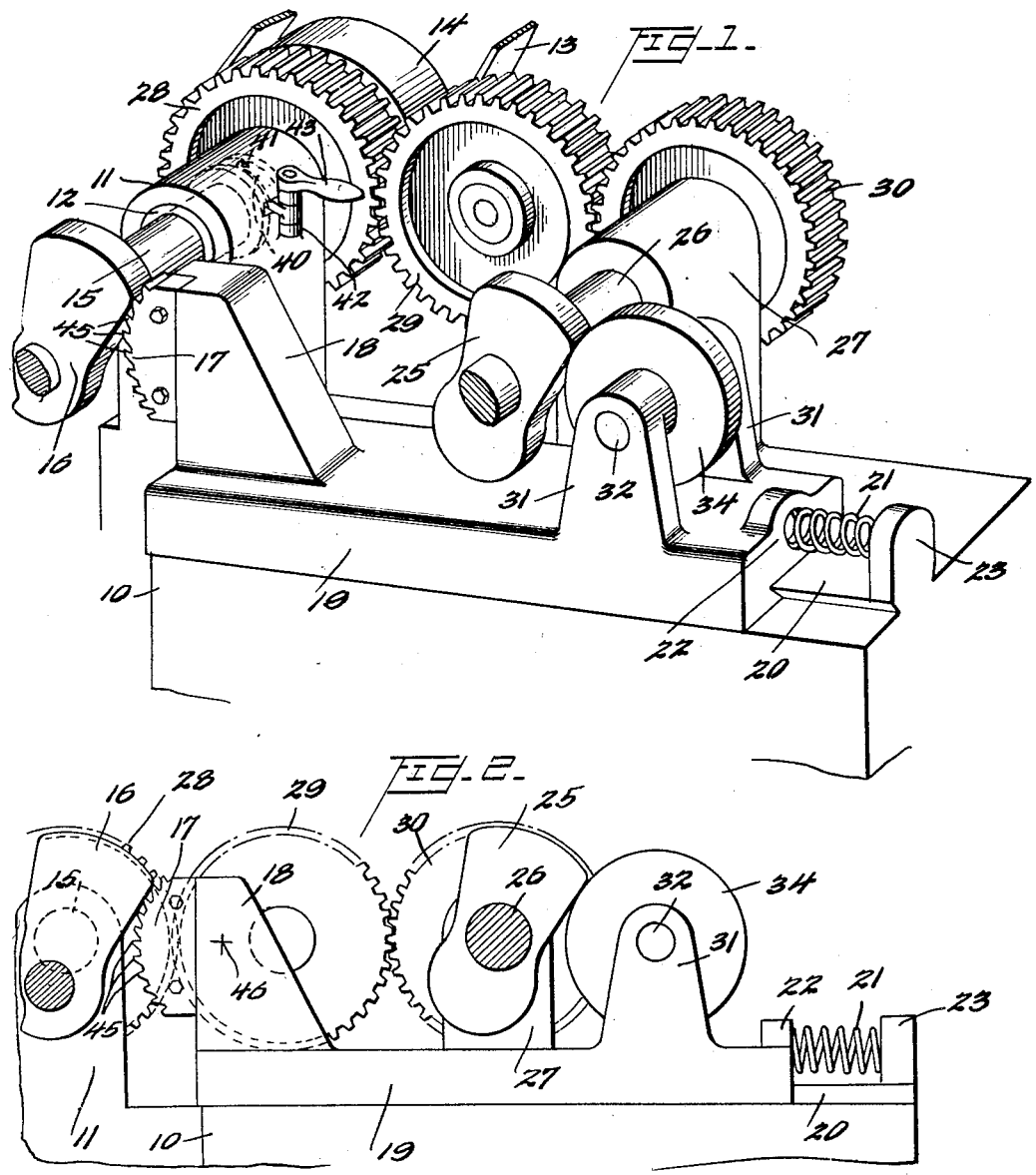

Patented Mar. 1, 1932

1,847,171

UNITED STATES PATENT OFFICE

JOHN M. CHRISTMAN, OF DETROIT, MICHIGAN, ASSIGNOR TO PACKARD MOTOR CAR COMPANY, OF DETROIT, MICHIGAN, A CORPORATION OF MICHIGAN

PATTERN LATHE

Application filed April 7, 1930. Serial No. 442,364.

This invention relates to metal working machinery and particularly to what may be termed pattern lathes.

It is a general object of the present invention to provide a novel and improved machine of the type described.

One of the important features of the invention resides in the provision of a machine for turning non-circular cylinders such, for instance, as cams, crank cheeks and the like by the use of a pattern of the same size and profile as the part to be machined.

Another object of the invention consists in the particular arrangement and relative positions of the work, the cutter, the pattern cam and the cam follower whereby the work is profiled identical with the pattern.

Other and further objects and features of the invention will be more apparent to those skilled in the art after a perusal of the accompanying drawings and following specification wherein, for the sake of simplicity, an embodiment of the machine for turning crank cheeks is disclosed.

In said drawings:

Figure 1 is a perspective view of a sufficient portion of the machine to operate on a single crank cheek; and Figure 2 is a section through the machine vertically and at right angles to the axis of the work.

The invention in this case comprises a lathe-like machine provided with means to hold and rotate a shaft upon which it is desired to machine one or more non-circular cylinders together with a tool or tools adapted to be moved toward and from the work under the action of a pattern cam driven in synchronism to the work.

Referring now to the drawings, there is shown at 10 a suitably supported lathe bed or shear provided at one end with an upright carrying a bearing member 11 in which is journalled a rotatable work holder 12 adapted to be driven, for instance, by the belt 13 and pulley 14. The work, in this case the crank shaft 15, is adapted to be suitably secured in the work holder for rotation therewith and is shown as being provided with a roughly formed crank cheek 16, the cylindrical surface of which it is desired to machine to a definite non-circular profile.

A cutter or tool 17 is mounted for reciprocation toward and from the work and for this purpose is conveniently attached to a vertical projection 18 on the reciprocable carriage 19 grooved to run on the dovetailed ways 20 on the lathe shear. It is normally biased toward the work by means of the spring 21 engaging between the carriage portion 22 and a stationary abutment 23 on the shear.

Movement of the carriage and hence the tool to properly profile the work is effected by means of a pattern cam 25 mounted on a shaft 26 journalled at 27 for rotation with its axis parallel to that of the axis of the work 15 and driven from the work holder drive by means of the gear 28 on the work holder, the intermediate gear or idler 29 and the gear 30 on the shaft 26. The gears are so selected that the cam rotates at the same speed as the work and the initial setting of the machine must be such that not only do the work and cam rotate in synchronism but in phase.

The carriage mounts a pair of upwardly extending pillars 31 supporting between them a shaft 32 parallel to the shaft 26 and having journalled thereon the circular cam follower 34 which is always held in engagement with the cam 26 by means of the spring 21.

It will be seen that as the machine is driven the carriage will be reciprocated toward and from the work so that the cutter will profile the blank 16, but in order that this may take place it is necessary to provide relative traversing movement between the work and the cutter. This may be accomplished in any conventional manner but it is preferred to provide some means to traverse the work holder and work. This may readily be accomplished by permitting the work holder to slide longitudinally in the bearing block 11 and by providing for instance, a simple fork member 40 having pins 41 bearing in a groove in the work holder. The fork may be pivoted at 42 to the bearing block 11 and provided with a handle 43 for its manual operation, or some well known automatic feed mechanism may be provided.

An important feature of this invention resides in the layout of the parts which permits the pattern cam 25 to be of the same size and profile as the desired finished work, for this materially simplifies the laying out of the pattern cam. In order that this result may be accomplished, it is necessary that the cutting tool have a plurality of cutting points 45 arranged on the true arc of a circle having the exact same diameter as the cam follower 34; and that the cam follower 34 be not only in the same vertical relationship to the center of rotation of the cam 25 as the cutter 17 is to the center of rotation of the work; but that it also be on the same side of the cam as the cutter is of the work.

The cutting tool as shown in Figure 2 has its center of curvature at 46 and each of the cutting points is substantially radial to this center as clearly seen so that the proper angle of approach to the portion of the work being cut is effected at all times. As shown in Figure 2 the most convenient way to design the machine is to have the centers of the four members, i. e. the work, the cutter, the cam and the cam follower, lying in the same plane for in this manner the thrust of the cam on the cam follower is always directly behind the thrust of the work on the cutter.

In operation, the work is rotated in the proper direction, in synchronism and in phase with the cam shaft and consequently the cam reciprocates the carriage so that the tool closely follows the periphery of the blank cheek. As the machine is in operation the operator, by means of the feed device, traverses the work and thereby feeds it longitudinally to the tool. Thus the tool traverses the periphery of the cheek and takes the required depth of cut to finish the blank to the profile of the pattern cam.

In cutting crank cheeks such as shown in the drawings, where there are two similar adjacent cheeks, two similar tools may operate simultaneously upon these adjacent cheeks, being mounted for this purpose on a single tool holder on the carriage.

It will be understood that there may be as many tool holders and cam operating means therefor as there are crank cheeks or in the case of cam shafts as there are cams.

While there is herein described in some detail a specific embodiment of the invention which is deemed to be new and advantageous and which may be claimed specifically, it is to be understood that the invention is not limited to the exact details of construction as it will be apparent that changes may be made therein without departing from the spirit or scope of the invention.

Having thus described the invention, what is claimed as new and desired to be secured by Letters Patent is:

1. In a lathe for turning non-circular cylinders, the combination with a rotating work holder of a carriage movable in a right line toward and from the work, a fixed tool having a plurality of cutting points mounted on said carriage, said points being arranged on the arc of a circle, a pattern cam mounted to rotate in synchronism with the work holder and being of the same size and profile as the desired finished form of the work, a roller on said carriage in operative engagement with said cam and in the same relative position thereto as the cutter to the work, said roller being of the same radius as the arc of the cutting points, and means to hold the roller in engagement with said cam.

2. In a lathe for turning non-circular cylinders, the combination with a rotating work holder, of a carriage movable toward and from the work, a fixed tool mounted on said carriage and having cutting points arranged on the arc of a circle, a pattern cam mounted to rotate in synchronism with the work holder and being of the same size and profile as the desired finished form of the work, a roller on said carriage, means to hold the roller in operative relation to the cam, said roller being of the same radius as the arc of said cutting points.

3. In a lathe for turning non-circular cylinders, the combination with a rotatable work holder, of a carriage movable toward and from the work, a pattern cam of the same size and profile as the desired non-circular cylinder, a cam follower roller mounted on said carriage and on the side of the cam opposite the work, means driving the cam and work holder in synchronism, means to maintain the cam and follower always in engagement, a fixed multipointed cutter carried by said carriage, said points being arranged on the arc of a circle of the same radius as said cam follower, and means to relatively traverse said work holder and said cutter.

4. In a lathe for turning non-circular cylinders, the combination with a rotatable work holder, of a carriage movable toward and from the work, a pattern cam of the same size and profile as the desired non-circular cylinder, a cam follower roller mounted on said carriage and on the side of the cam opposite the work, means driving the cam and work holder in synchronism, means to maintain the cam and follower always in engagement, a fixed multipointed cutter carried by said carriage on the cam side of the work, said points being arranged on the arc of a circle of the same radius as said cam follower, and means to relatively traverse said work holder and said cutter.

5. In a lathe for turning non-circular cylinders, the combination with a rotatable work holder, of a fixed cutting tool movable toward and from the work, said tool having a plurality of cutters arranged on the arc of a circle and each substantially radiating from the center of said arc, a circular cam follower of the same radius as said arc associated with said tool, a cam of the same size and contour as the desired finished work means maintaining said follower engaged with said cam on the side thereof opposite said work and means to rotate said work holder and cam in synchronism.

6. In a lathe for turning non-circular cylinders, the combination with a rotatable work holder, of a cutting tool movable toward and from the work and having a plurality of fixed cutters on the arc of a circle, a circular cam follower of the same radius as that of the cutters operatively associated with said tool, a cam of the same contour as the desired finished work, means maintaining the follower engaged with the cam in the same relative position thereto as the tool to the work and means to rotate said work and cam in synchronism.

In testimony whereof I hereunto affix my signature.

JOHN M. CHRISTMAN.